(12) United States Patent
Hecht et al.

(10) Patent No.: US 9,327,913 B2
(45) Date of Patent: *May 3, 2016

(54) STOCKING SYSTEM AND COLLECTION DEVICE, AND METHOD FOR ITS UTILIZATION

(71) Applicants: Jean Claude Hecht, Porto Covo (PT); Jean Louis Hecht, Hombourg-Haut (FR)

(72) Inventors: Jean Claude Hecht, Porto Covo (PT); Jean Louis Hecht, Hombourg-Haut (FR)

(*) Notice: Subject to any disclaimer, the term of this patent is extended or adjusted under 35 U.S.C. 154(b) by 9 days.

This patent is subject to a terminal disclaimer.

(21) Appl. No.: 14/243,749

(22) Filed: Apr. 2, 2014

(65) Prior Publication Data
US 2014/0346017 A1 Nov. 27, 2014

Related U.S. Application Data

(63) Continuation of application No. 13/326,821, filed on Dec. 15, 2011, now Pat. No. 8,720,741.

(30) Foreign Application Priority Data

Apr. 8, 2011 (FR) ...................................... 1153052

(51) Int. Cl.
| | | |
|---|---|---|
| *B65G 47/46* | (2006.01) | |
| *G07F 11/16* | (2006.01) | |
| *A21B 3/07* | (2006.01) | |
| *B65G 1/06* | (2006.01) | |
| *G07F 11/42* | (2006.01) | |
| *G07F 11/58* | (2006.01) | |
| *B65G 37/00* | (2006.01) | |

(52) U.S. Cl.
CPC . *B65G 47/46* (2013.01); *A21B 3/07* (2013.01); *B65G 1/06* (2013.01); *B65G 37/00* (2013.01); *G07F 11/165* (2013.01); *G07F 11/42* (2013.01); *G07F 11/58* (2013.01)

(58) Field of Classification Search
CPC ........ G07F 11/58; G07F 11/60; G07F 11/165
USPC .................. 221/119, 218, 253; 198/576, 586
See application file for complete search history.

(56) References Cited

U.S. PATENT DOCUMENTS 4,687,119 A * 8/1987 Juillet ........................... 221/101
5,048,719 A * 9/1991 Empl et al. .................... 221/119

(Continued)

*Primary Examiner* — Timothy Waggoner
(74) *Attorney, Agent, or Firm* — Buche & Associates, P.C.; John K. Buche; Bryce A. Johnson (57) ABSTRACT

The invention pertains to a stocking system and collection device consisting of a linear conveyor system and a second linear conveyor system parallel to the first and placed in alignment with it so that an object placed on the first conveyor system may be transferred to the second conveyor system. In accordance with the invention, the means are anticipated to move the second conveyor system perpendicularly to the direction of the conveyance so that the second conveyor system can be move from a position situated in alignment with the first conveyor system to a position for distribution. It is preferable that the first conveyor system (100) consist of three parallel belts (110, 120, 130) placed side by side; the first (110) and the third (130) belts extend farther in advance in the direction of the second conveyor system (200) at a distance (d) than the second belt (120). Similarly, the second conveyor system (200) consists of three parallel conveyor belts (210, 220, 230) placed side by side; the first (210) and the third (230) belts extend less in behind, in extension, one after the other, and the second belts (120, 220) at least partially extend one after the other; the first drivers are anticipated to drive the three belts of the first conveyor system and the second drivers are anticipated to drive the two belts of the second conveyor system in the same movement.

14 Claims, 4 Drawing Sheets

(56) References Cited

U.S. PATENT DOCUMENTS

| | | | |
|---|---|---|---|
| 6,131,399 A * | 10/2000 | Hall | 62/127 |
| 6,722,267 B2 * | 4/2004 | Ciprietti et al. | 99/468 |
| 6,808,082 B2 * | 10/2004 | Ohkubo | 221/123 |
| 7,647,865 B2 * | 1/2010 | Vidondo | 99/334 |
| 8,720,741 B2 * | 5/2014 | Hecht | G07F 11/58 221/119 |
| 8,827,068 B2 * | 9/2014 | Weiss | 198/456 |

* cited by examiner

STOCKING SYSTEM AND COLLECTION DEVICE, AND METHOD FOR ITS UTILIZATION

CROSS-REFERENCE TO RELATED APPLICATIONS

This application is a continuation of U.S. patent application Ser. No. 13/326,821 (filed Dec. 15, 2011) which claims the benefit, under the treaty of Paris, of the French Pat. App. Demand No. 1153052 and Submission No. 1000108664 (filed Apr. 8, 2011). Both documents are hereby incorporated by reference in their entirety.

STATEMENT REGARDING FEDERALLY SPONSORED RESEARCH OR DEVELOPMENT

Not Applicable.

BACKGROUND OF THE INVENTION

1. Field of Invention

This invention pertains to a stocking and removal system comprised of an initial linear conveyor system and a second linear conveyor system parallel to the first system and aligned so that an object placed on the first conveyor system may be transferred to the second conveyance system. The invention also concerns a procedure for the usage of this system.

2. Background

Stocking systems and collection devices are commonly used in food processing for items such as breads. EP 0 368 699 A2, for example, is a known automated baguette distributor. The distributor is composed of a stocking zone and a conveyor belt. The stocking zone is composed of several inclined trays, placed one over the other. The lowest extremity of each tray ends by a support which prevents the baguettes from slipping from the tray. The conveyor system is met with a transfer unit fixed on an endless chain so that the transfer may be displaced from bottom to top before the trays in order to transport the baguettes then from top to bottom of the other side of the conveyor in order to deposit them on a ramp which conducts them to be reheated and then to the distribution area. The collection device consists of two hooks fixed by an axle on an endless chain and fixed with a counterweight. When not in use, the two hooks are inclined in the direction of the trays as a result of the counterweight. Two openings in the tray supports allow the hooks to enter them while they are in the inclined position. If a baguette is on the lower portion of the tray, it is caught by the hooks which rise and, with the weight of the baguette, tip vertically so that they do not pass over the trays. For this system to function, it is imperative that the baguettes or other food products do not stick to the trays so that they are prevented from sliding to the tray supports to be caught. Moreover, the order of the baguette transfer is imposed by the procedure of the collection devices: the baguettes of the lower trays are transferred first, then those of the tray directly above and so on until the highest tray. Therefore, it is necessary to wait for all of the baguettes to be transferred before refilling the unit. Finally, during the stocking process and distribution, the baguette risks flipping over so that when put into position to prepare for distribution, it is not oriented properly. It becomes impossible, for example, to bake a raw or frozen baguette with the upper side containing slits placed systematically on top.

The document EP 0 337 836 A1 describes a machine used in the preparation and distribution of hamburgers. It consists of a series of conveyors placed one after the other. A fresh or frozen hamburger patty is placed on the first conveyor. It is then transferred to the second conveyor that passes through an oven. Once out of the oven, the hamburger leaves the second conveyor to pass onto the third conveyor on which half of a bun was placed beforehand. The hamburger patty and bun half pass under sauce distributors before the other half of the bun is placed on top. The hamburger leaves the third conveyor to pass onto a forth conveyor on which it is wrapped. In any case, the hamburger rests clearly in the same path during the whole course of the preparation. The transfer can only be made by means of a single conveyor belt.

SUMMARY OF THE INVENTION

The objective of this invention is to permit the distribution of an object transferred in a plan different from that which it was initially stocked, while still conserving the orientation of the object to be transferred. The second objective is to permit the utilization of a second conveyor unit with different initial conveyor units. A third objective of the invention is to assure the reliable, seamless transfer of a sole object without need of support.

The first objective is obtained by the fact that the means are provided for by moving the second conveyor unit in a movement perpendicular to its direction so that the second conveyor unit may be moved from its position situated in the alignment of the first conveyor system to a distribution position. It is possible to move the second conveyor system of the stocking plan in the second plan located above or below, so that the object, for example, a baguette, is accessible by the technician or machine handling it.

In a closed trial of the invention, the system is comprised of several identical initial conveyor units arranged one over the other. The means of transport can place the second conveyor unit in the interchangeable alignment of each one so that an object placed on the first conveying unit then passes to the second conveying unit and may be transmitted to the last. Thus, the second conveying system may be used with several initial conveyor systems, which allows an augmentation in the quantity of objects stocked.

In an initial trial variation of the invention, the first conveyor unit consists of at least two parallel conveyor belts placed side by side; the first belt extends farther in advance in the direction of the second conveyor unit of a distance (d) from the second belt. Similarly, the second conveyor unit consists of at least two parallel conveyor belts placed side by side; the first belt extends less in the direction behind the initial conveyor unit for distances (d) than the second belt, the first conveyor belts are at least partially aligned one after the other, and the second belts are at least partially aligned one after the other; the initial attempted trials were anticipated in order to train in the same movements of the two belts of the first conveying unit and the second trial was anticipated to train in the same movement of the two belts of the second conveying system.

It is preferable in this case that the first conveyor system incorporate a third conveyor belt identical to the first, arranged symmetrically in relation to the second belt and lead by the first channel, and so that the second conveyor system consists of a third conveyor belt identical to the first, arranged symmetrically in relation to the second belt and lead by the second channel, the third belts are at least partially extended one after the other.

Two or three belts are anticipated, and these systems assure the best transfer of the object from the first conveying system on the second conveyor system. In fact, the object, when it leaves the second conveyor belt of the first conveyor system to pass to the second belt of the second conveyor system, is found in the unsupported space between the two belts. But at the same time, a part of the object is always on the first belt, and if necessary on the third belt, of the first conveyor system. A part of the object is then always carried by one or two belts of the first conveyor system. There is not a discontinuity in the support of the object when it passes from the first to the second conveying system.

After finding the object's position on the second conveyor system, it is recommended to anticipate a support at the edge before the second conveyor system, that is, opposite the first conveyor system.

After allowing the stocking and removal of several objects stacked perpendicular to the direction of the movement of the conveyor system, it is possible to anticipate that the first conveying systems should consist of several rounds of first and second belts, or of the first round, of second and third belts, arranged side by sister, and that the second conveying system should consist at the same time of rounds of first and second belts, or of rounds of the first, of second and third belts, arranged side by side so that each round of the first conveying system corresponds to a round of the second conveying system.

According to necessity, the conveyor belts may be made up by belts of joined plates or grills.

The invention also concerns a method for system utilization of the invention to stock an object on the first conveying system and the removal on a second conveying system after being channeled to a distribution position, characterized by the following steps:

(a) the second conveying system is moved by the channel to be aligned with one of the initial conveying units;
(b) the second conveying system and the first conveying system in the alignment where the second conveying system is found is put into use before so that the object situated on the first conveying system is moved in the direction of the second conveying system while the other initial conveying units remain at rest;
(c) The object leaves a part of the first conveying system and passes a part to the second conveying system;
(d) The second conveying system is moved upwards to a predetermined height (h);
(e) The first conveying system is stopped and the second conveying system is stopped once the object reaches a position determined by the second conveying system;
(f) The second conveying system is moved by channels until it reaches a position for distribution.

It is preferable that step (d) is accomplished as soon as the object has left the second belt of the first conveying system, all while resting on the first belt and third belt, if there is one, and it passes to the second belt of the second conveyor system without having to pass through the first and third belt if there is one.

Additionally, it is recommended that at step (e), the first conveying system should first be run in reverse before being switched off.

After repositioning an object which has been put through the second conveying system during the transfer, it is possible at step (e) to maintain the second conveying system operational until the object bumps into the support. In this case, it can be anticipated to start the second conveying system after the object bumps into the support until the object has reached an intermediary position determined by the second conveying system.

BRIEF DESCRIPTION OF THE FIGURES

The invention is described in detail below with the help of an example presented in the figures shown.

DETAILED DESCRIPTION OF PREFFERED EMBODIMENTS

The invention concerns a system of stocking and distribution. The example of fulfillment presented in FIGS. 1-5 is designed for stocking and removal of precooked baguettes ahead of being then put into the oven to finish baking. During this the invention's system may be utilized in a completely different domain.

As is standard the forefront of the system is found at the side of the second conveyor system (200) opposite the first conveyor system (100). In practical terms, the forefront is found on the left of the figures, while the rear is found on the right. To operate a conveyor system means that the upper side, on which the objects to be transmitted rest, move to the left. In contrast, to operate a system in reverse means to move the upper side of the conveyor to the right.

The invention's system is composed of two principle portions: one fixed portion (100) and one mobile portion (200).

The fixed portion (100) is composed of a horizontal tray fixed in a frame (101). The tray consists of three, endless, and parallel conveyor belts (110, 120, 130) placed side by side. These three belts may be carried in the same movement by a motor not represented and making the first sources of conveyance. Each belt is suspended by two rollers (111, 112; 121, 122; 131, 132). The six rollers are parallel. The three rear rollers (111, 121, 131), situated to the right of the diagrams, are aligned and may be joined into a single common roller. The front roller (122) of the central belt is placed farther back of a distance (d) than the front rollers (112, 132), the two exterior belts. This fixed portion makes the first conveyor system.

The mobile portion is composed of a mobile, horizontal tray. The mobile tray is comprised also of three conveyor belts (210, 220, 230) placed side by side, parallel to one another and also to the conveyor belts (110, 120, 130) of the fixed tray. These three belts may be carried in the same movement by a motor not represented and this makes up the second source of conveyance. Each belt is suspended between two rollers (211, 212; 221, 222; 231, 232). The six rollers are parallel to one another and to rollers (111, 112; 121, 122; 131, 132) of the fixed tray. The three front rollers (212, 222, 232) at left in the figures are aligned and may be joined by a single, common roller. The rear roller (221) of the central belt (220) is placed farther back at a distance (d) than the rear rollers (211, 231) of the two exterior belts (210, 230): the central belt (220) is longer than the two exterior bands (210, 230). This mobile portion makes up the second conveyor system.

The length difference between the two exterior belts (110, 130) and the central belt (120) of the fixed plate is logically equal to the length difference between the central belt (220) and the exterior belts (210, 230) of the mobile tray.

Seen from above (FIG. 1), the first belts (110, 210) are logically in the same extension one after the other. It is the same for both the second belts (120, 220) and the third belts (130, 230). It is possible that two belts in the same extension, one after the other, do not have exactly the width and/or that their lateral edges are not exactly facing one another without disrupting the function of the system.

The mobile tray (200) can move along a frame (201) in a vertical movement propelled by the nonrepresented source. It may also be aligned with the mobile tray, meaning that the conveyor belts (210, 220, 230) are found in the same horizontal as the belts (110, 120, 130) of the fixed tray. It may also be moved into another position that will be described further on.

Figure 1:
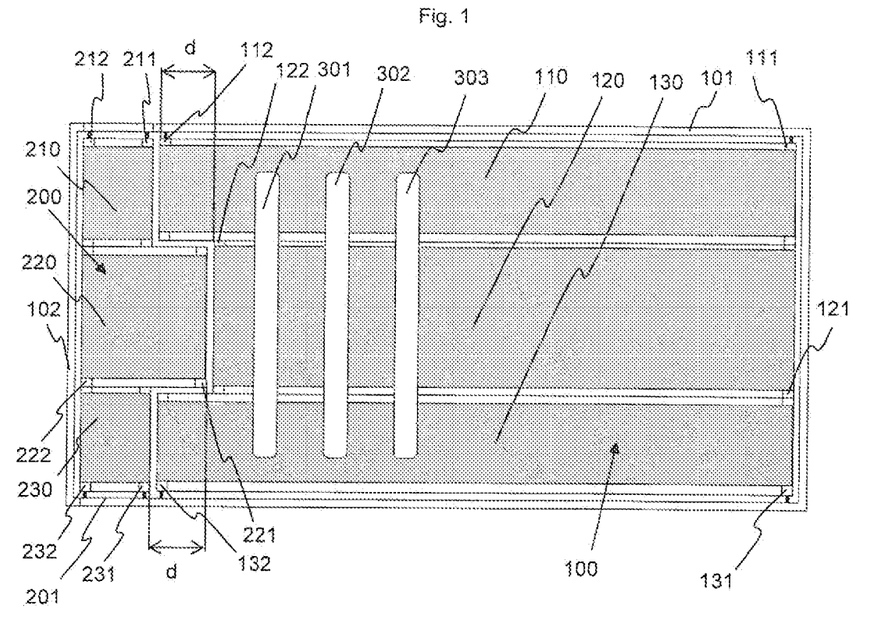
FIG. 1 depicts a schematic view from above the unit.
Figure 2A:
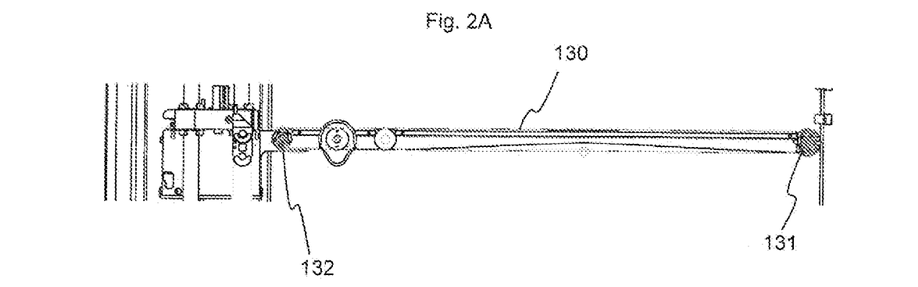
FIG. 2A depicts a side view of the invention's system with the mobile portion in an aligned position.
Figure 2B:
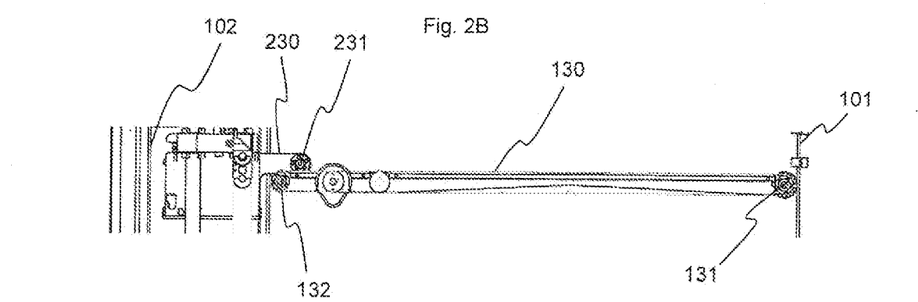
FIG. 2B depicts a side view of the invention's system with the mobile portion in a raised position.
Figure 3A:
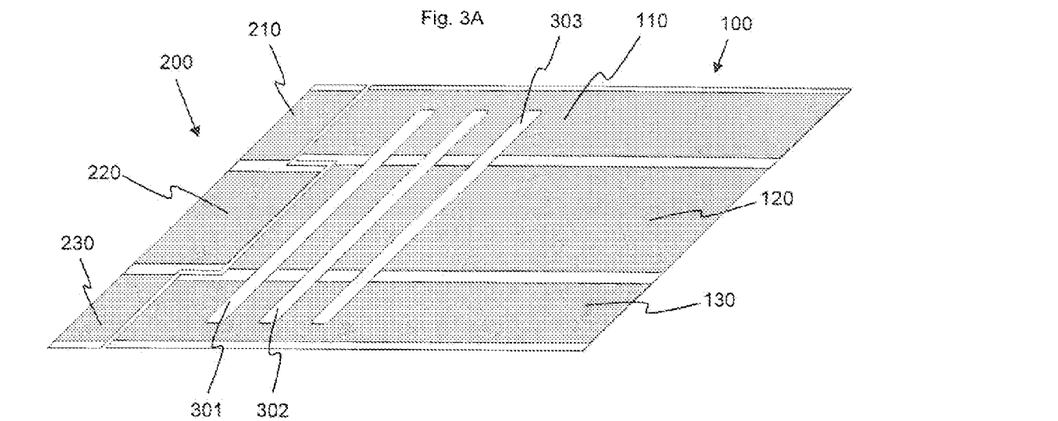
FIG. 3A depicts a schematic view of the invention's system with the mobile portion in an aligned position
Figure 3B:
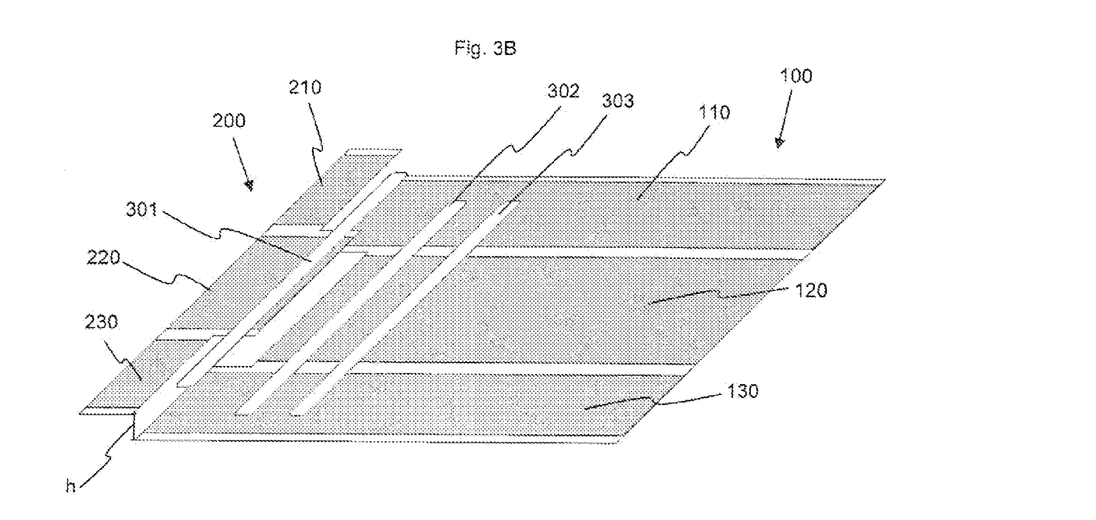
FIG. 3B depicts a schematic view of the invention's system with the mobile portion in a raised position.
Figure 4A:
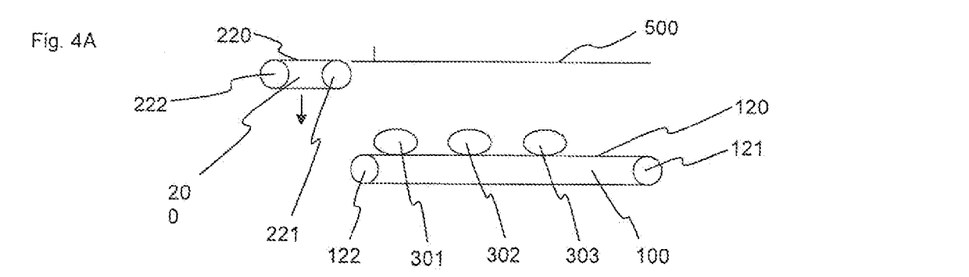
FIG. 4A depicts a schematic representation of the first step of the invention's removal process.
Figure 4B:
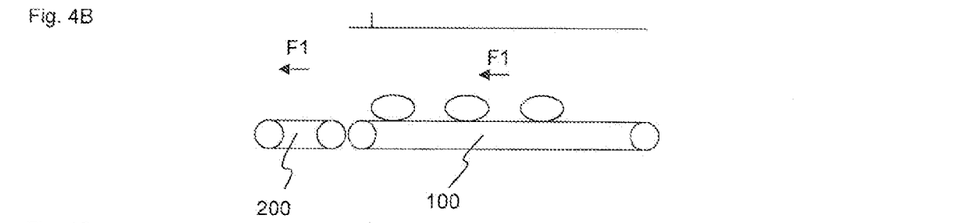
FIG. 4B depicts a schematic representation of the second step of the invention's removal process.
Figure 4C:
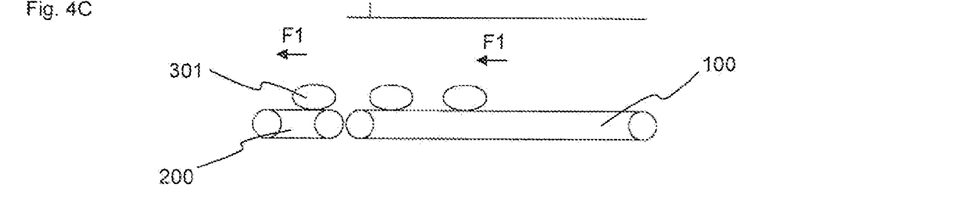
FIG. 4C depicts a schematic representation of the third step of the invention's removal process.
Figure 4D:
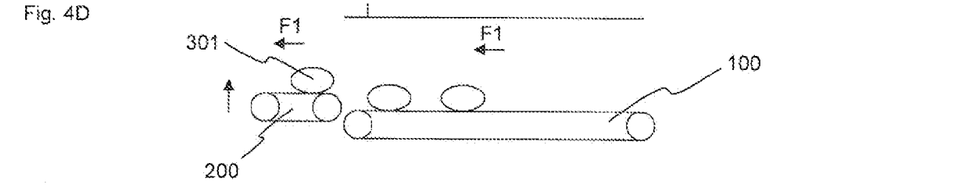
FIG. 4D depicts a schematic representation of the fourth step of the invention's removal process.
Figure 4E:
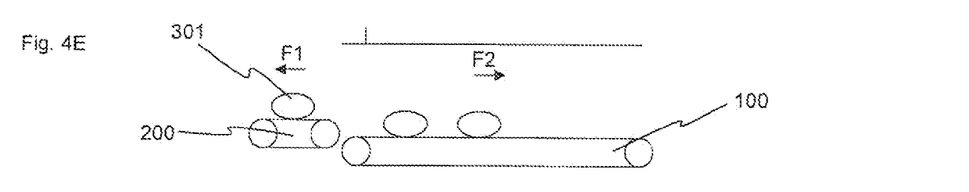
FIG. 4E depicts a schematic representation of the fifth step of the invention's removal process.
Figure 4F:
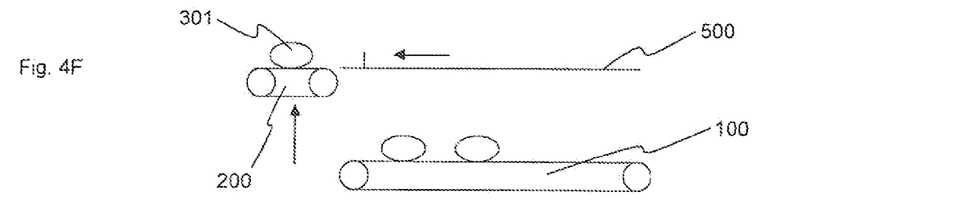
FIG. 4F depicts a schematic representation of the sixth step of the invention's removal process.

In the aligned position represented in FIGS. 2a and 3a, the front rollers (112, 122, 132) of the fixed tray's conveyor belts are also as close as possible to the rear rollers (211 221, 231) of the mobile tray so that the space that separates the conveyor belts of the fixed tray and those of the mobile tray are as low as possible in order to prevent friction between them.

The conveyor belts (110, 120, 130, 210, 220, 230) may be presented in different forms. This may include different forms: straps, bands, or joined grills.

The system may contain several fixed, identical trays (100) placed one over the other in the frame (101) so that the front rollers (112, 132) of the exterior belts are placed in the same vertical plane and the front roller (122) of the central belt in the same vertical plane in the background, meaning more to the right un the figures. Thus, the mobile portion (200) may be placed by alternating the sources of conveyance in aligning different fixed trays (100) so that an object places on the fixed tray in the alignment may be passed onto the mobile tray and transferred to the last.

Figure 5:
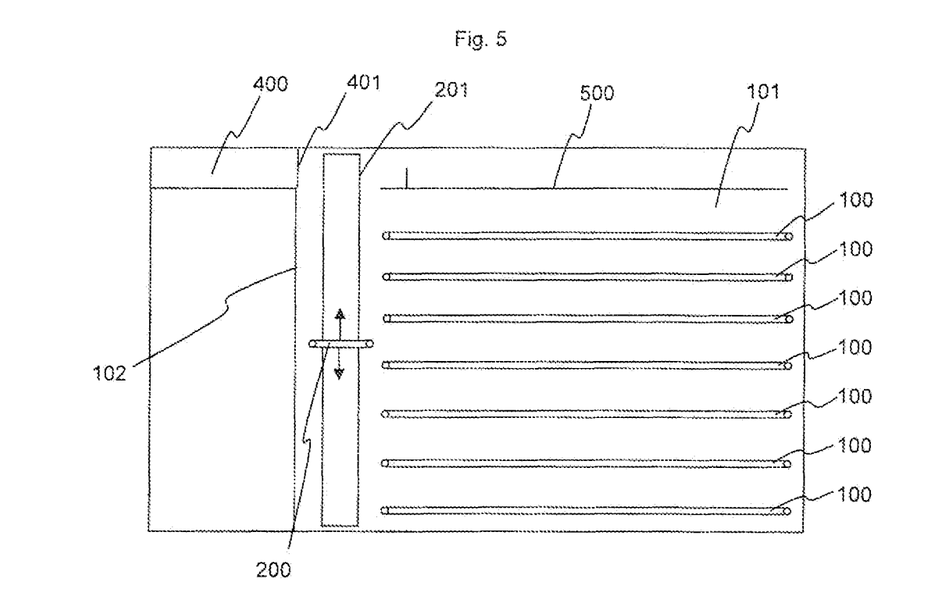
FIG. 5 depicts a schematic view of the invention's system integrated in an automated machine for stocking and cooking bread.

The invention's system may be integrated with a machine for automated cooking similar to the one schematically represented in FIG. 5. Several fixed trays (100) are placed one over the other in a frame (101) forming a five sided enclosure. In front of the fixed trays is the mobile tray (200) mounted on a frame (201) located in the frame's extension (101). Above the highest tray, there is a device (500) to take a baguette in the distribution position from the mobile tray (200) and put it in an oven (400) located in front of the device which places the item in the oven (500). The enclosure made by the frame (101) and the frame (201) are closed in front by a wail that extends into the space above the door (401) of the oven. This enclosure may be refrigerated to guarantee an optimal conservation of the precooked baguettes.

The invention's system functions in the following manner. The precooked baguettes (301, 302, 303) are placed on the fixed trays (100), parallel to one another and perpendicular to the conveyor belts (110, 120, 130). Removal is achieved through the following steps:
  a) The mobile tray (200) is moved to align it with one of he fixed trays (100), like those of FIGS. 2a, 3a, 4b.
  b) The conveyor belts of the fixed trays and mobile trays are operated so that their upper sides move at the same speed to the left in the direction of the arrow (F1) The baguettes (301, 302, 303) of the fixed tray move in the same direction.
  c) The first baguette (301) leaves the central belt (120) of the fixed tray to pass to the central belt (220) of the mobile tray all while resting with its extremities on the exterior belts (110, 130) of the fixed tray.
  d) As soon as the central part of the baguette is passed through the central belt (220) of the mobile tray, which gently rises to the elevated position represented in FIGS. 2b, 3b and 4d. The extremities of the removed baguette leave the exterior belts (110, 130) of the fixed belt.
  e) At the same time, the belts of the fixed tray are stopped while the belts of the mobile tray continue to move forward in the direction of the arrow (F1) until the extremities of the removed baguette (301) are found on the exterior band (210, 230) of the mobile tray. The conveyor belts (210, 220, 230) are stopped in turn.
  f) The mobile tray (200) is displaced in a vertical movement until the reaching the distribution position. In the example presented here, this position faces of the entrance to the oven (400), in front of the device for placing items into the oven (500).

At step e), while the mobile tray is in the elevated position, it can be useful to put the conveyor belts (110, 120, 130) of the fixed tray into reverse so that the upper part goes back in the direction of the arrow (F2). This ensures that a second baguette placed too close is not removed at the same time as the baguette before.

It can be useful to anticipate a support at the extremity before (at left in the figures) the conveyor belts (210, 220, 230) of the mobile tray to correct a baguette which may have been put askew during removal. Thus, the first end reaches the support before the other which still moves along the conveyor belt until the baguette is once again perpendicular to the belt. Once the baguette is repositioned, it can be useful to center it on the mobile tray by putting the mobile tray in reverse for a necessary time.

The support can be an integral part of the mobile tray. However, in the case presented in the figures, such a support would prevent the baguette from being placed into the oven. It can be considered then as part of the oven (401); in which case, the repositioning of a skewed baguette cannot be that of a distributing position. It may consist equally of the front wall (102) of the stocking magazine, the wall (102) along which the mobile tray moves (200).

The control of the system may be assured by a unit of command not Represented. The choice of fixed tray from which the baguettes will be removed for distribution depends on the criteria stored in the control unit. Notably, it will be possible to recharge one or another of the trays and to program the hour for refilling. It is then not necessary to wait until the device is empty before refilling it. The control unit then chooses to remove a baguette for distribution from a tray while the trays higher up are stocked. If this duration surpasses a time limit, the control unit will freeze actions with the corresponding tray and dispatch the mobile tray towards another tray.

Sensors may be placed at strategic locations. In particular, a sensor can be anticipated to determine the moment when the center of the baguette will pass entirely to the central belt (220) of the mobile tray in order to trigger the belts rise. Another sensor can determine if the baguette is correctly perpendicular to the conveyor belts of the mobile tray, or if it is necessary to launch a process to adjust the baguette's position. Sensors can also determine the vertical position of the mobile tray.

Thanks to the system of the invention, the transmission of properly oriented baguettes is assured, meaning that the upper side rests facing up. This is important particularly if the system must deliver a baguette to be baked in an oven. In placing several trays one over the other, the system's stocking capacity augments considerably while requiring only a mobile tray system. With a central belt turning between two exterior conveyor belts, the transfer of a single object is assured without disrupting the flow of the process.

The trial example represented here may be generalized.

The transition between two trays is accomplished by the central, shorter conveyer belt on the fixed tray and the longer one on the mobile tray, permitting a transfer without disruption of the fixed tray to the mobile tray: at no moment is the baguette found to be without support from the fixed tray and from that of the mobile tray.

However, if the object passing from the fixed tray to the mobile tray is sufficiently large and/or rigid enough, it is possible to compensate for the excess or difference so that the three front rollers (112, 122, 132) of the fixed tray are aligned the same as the rear rollers (211, 221, 231) of the mobile tray. In this case, it becomes possible to abandon the three belts in order to conserve one of them.

On the other hand, if the objects stocked on the fixed trays have dimensions that make it possible to put several on the same row perpendicular to the transport, it becomes possible to anticipate several groups of transfers, and then several periods of disruption. Take, for example, pizzas that can be placed by rows of three. The mobile tray will then have three sets of three conveyor belts; the central belts will be shorter than the exterior bells in each set. Similarly, the mobile tray will have three sets of three conveyor belts; the central belts will be shorter than the exterior belts in each of the sets. A common conveyor belt can even be joined from the exterior, adjacent belts of the two successive sets.

We claim:

1. A stocking and dispensing system comprising:
a fixed tray defined by at least two conveyor belts;
a movable tray defined by a at least two conveyor belts;
a means for raising or lowering the movable tray with respect to the fixed tray;
a means for driving the conveyor belts of the fixed tray;
a means for driving the conveyor belts of the movable tray;
wherein the fixed tray is configured to receive an item at a first position on both of said two conveyor belts of the fixed tray and convey the item via the conveyor belt to a second position on only one of said two conveyor belts of said fixed tray;
wherein the movable tray is configured to receive the item at the second position via one of said conveyor belts of the movable tray and convey the item to a third position on both of said two conveyor belts of the movable tray.

2. A method of stocking and dispensing bread loafs comprising the steps of:
(a) placing a bread loaf on side-by-side conveyor belts so that the loaf is oriented across a first conveyor belt and a second conveyor belt at once, wherein the first conveyer belt extends farther than the second conveyor belt by a measurable distance;
(b) conveying the bread loaf to a movable tray defined by a third conveyor belt and a fourth conveyor belt, wherein the gray is positioned so that the third and fourth conveyor belts are respectively in a conveyor belt series with the first and second conveyor belts respectively, wherein the fourth conveyor belt extends farther than the third conveyor belt by a measurable distance;

(c) stopping the motion of the third and fourth conveyor belts after the loaf has been conveyed to a position on the movable tray;
(d) lifting the loaf by raising the movable tray; and,
(e) removing the loaf from the movable tray.

3. The method of claim 2 wherein during step (b) the bread loaf is oriented across the first conveyor belt and the fourth conveyor belt at once.

4. The method of claim 3 further comprising the step of stopping the motion of the first and second conveyor belts after loaf has been conveyed to a position on the movable tray.

5. The method of claim 4 further comprising the step of running the first and second conveyor belts in reverse before stopping its motion.

6. The method of claim 2 wherein a support is located at the edge of the third and fourth conveyor belt and wherein said position on the movable tray to which the loaf is conveyed is adjacent to the support.

7. The method of claim 6 further comprising the steps of:
Operating the third and fourth conveyor belts in reverse until the loaf arrives at an intermediate position on the movable tray.

8. The method of claim 6 further comprising the step of:
in advance of step (a), lowering the movable tray to a position wherein the first and second conveyor belts are in series with the fourth and third conveyor belts respectively.

9. The method of claim 6 further comprising the steps of:
(f) lowering the movable tray to a position wherein the first and second conveyor belts are in series with the fourth and third conveyor belts respectively.

10. The method of claim 6 further comprising the step of heating the bread loaf.

11. The method of claim 6 further comprising the step of eating the bread loaf.

12. A bread vending machine comprising:
a housing with a first opening and a second opening;
a fixed tray within the housing that is defined by a first and a second conveyor belt placed side by side, wherein the first conveyor belt extends farther than the second conveyor belt by a measurable distance;
a movable tray within the housing defined by a third and a fourth conveyor belt placed side by side, wherein the fourth conveyor belt extends farther than the third conveyor belt by a measurable distance;
a means for raising or lowering the movable tray with respect to the fixed tray;
a means for driving the conveyor belts of the fixed tray;
a means for driving the conveyor belts of the movable tray;
wherein the fixed tray is configured to receive an item at a first position through the first opening and convey the item via the conveyor belt to a second position;
wherein the movable tray is configured to receive the item at the second position and convey the item to a position on the movable tray;
wherein the movable tray is configured to lift the item to the second opening for removal from the housing.

13. The vending machine of claim 12 further comprising a means for heating the item.

14. The vending machine of claim 12 further comprising:
a second fixed tray that is the same as the first fixed tray and positioned above the first fixed tray;
a means for driving the conveyor belts of the second fixed tray;
wherein the movable tray may be raised from a position that is adjacent to the first fixed tray to a position that is adjacent to the second fixed tray so the conveyor belts of the movable tray may be in series with the belts of the second fixed tray.

\* \* \* \* \*